(12) United States Patent
Svensson et al.

(10) Patent No.: US 9,598,063 B2
(45) Date of Patent: Mar. 21, 2017

(54) METHOD FOR BRAKING A MOTOR VEHICLE

(71) Applicant: Ford Global Technologies, LLC, Dearborn, MI (US)

(72) Inventors: Thomas Svensson, Leichlingen (DE); Tim Jurkiw, Macomb, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/793,802

(22) Filed: Jul. 8, 2015

(65) Prior Publication Data

US 2016/0009261 A1    Jan. 14, 2016

(30) Foreign Application Priority Data

Jul. 9, 2014    (DE) .................... 10 2014 213 284

(51) Int. Cl.

| | |
|---|---|
| *B60T 7/00* | (2006.01) |
| *B60T 8/00* | (2006.01) |
| *B60T 8/171* | (2006.01) |
| *B60T 7/04* | (2006.01) |
| *B60T 8/40* | (2006.01) |
| *B60T 8/172* | (2006.01) |
| *B60T 8/88* | (2006.01) |
| *B60T 13/66* | (2006.01) |

(52) U.S. Cl.
CPC .............. *B60T 8/171* (2013.01); *B60T 7/042* (2013.01); *B60T 8/172* (2013.01); *B60T 8/4086* (2013.01); *B60T 8/885* (2013.01); *B60T 13/662* (2013.01); *B60T 2270/413* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,390,986 A | * | 2/1995 | Hall, III .................... | B60T 8/32 188/71.4 |
| 2015/0375719 A1 | * | 12/2015 | Zhang ..................... | B60T 8/172 701/70 |

FOREIGN PATENT DOCUMENTS

| | | |
|---|---|---|
| DE | 19951119 A1 | 4/2001 |
| DE | 10011269 A1 | 9/2001 |
| DE | 10137273 A1 | 3/2002 |
| DE | 19616732 A1 | 2/2007 |

\* cited by examiner

*Primary Examiner* — Yonel Beaulieu
(74) *Attorney, Agent, or Firm* — Burgess Law Office, PLLC; Raymond L. Coppiellie

(57) ABSTRACT

A motor vehicle braking method wherein the vehicle includes a brake operating unit generating a braking signal based on brake pedal travel. The method includes the step of measuring the vehicle deceleration and pedal position during vehicle braking and determining an actual ratio between the measured deceleration and pedal position. In addition, a target ratio is provided based on vehicle deceleration for a defined pedal position. Wherein the actual ratios compared with the target ratio and a braking adjustment is provided when the actual ratio deviates from the target ratio.

20 Claims, 3 Drawing Sheets

METHOD FOR BRAKING A MOTOR VEHICLE

CROSS-REFERENCE TO RELATED APPLICATIONS

Not Applicable.

BACKGROUND OF THE INVENTION

1. Field of the Invention

The present invention relates generally to a method for braking a motor vehicle; and, more specifically, to a method for performing a brake adjustment.

2. Description of Related Art

Motor vehicles with so-called "Brake-By-Wire" braking devices are known in the prior art. Such devices typically include an operating unit that generates an electrical braking signal. The signal is transmitted from the operating unit to a unit carrying out the braking. The operating unit in motor vehicles generally includes an actuating element, as a rule a brake pedal unit with a brake pedal that is displaceable along a pedal travel path, and a sensor that detects the position of the brake pedal. It is usual with braking methods to set a braking value, for example a brake pressure, depending on the brake pedal position.

In certain situations, for example in the event of fading of the brakes, the set braking value does not result in the usual deceleration of the motor vehicle that otherwise results from said pedal position. The driver can lose confidence in the braking device of the motor vehicle in this way.

SUMMARY OF THE INVENTION

A motor vehicle braking method wherein the vehicle includes a brake operating unit generating a braking signal based on brake pedal travel. The method includes the step of measuring the vehicle deceleration and pedal position during vehicle braking and determining an actual ratio between the measured deceleration and pedal position. In addition, a target ratio is provided based on vehicle deceleration for a defined pedal position. Wherein the actual ratios compared with the target ratio and a braking adjustment is provided when the actual ratio deviates from the target ratio.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
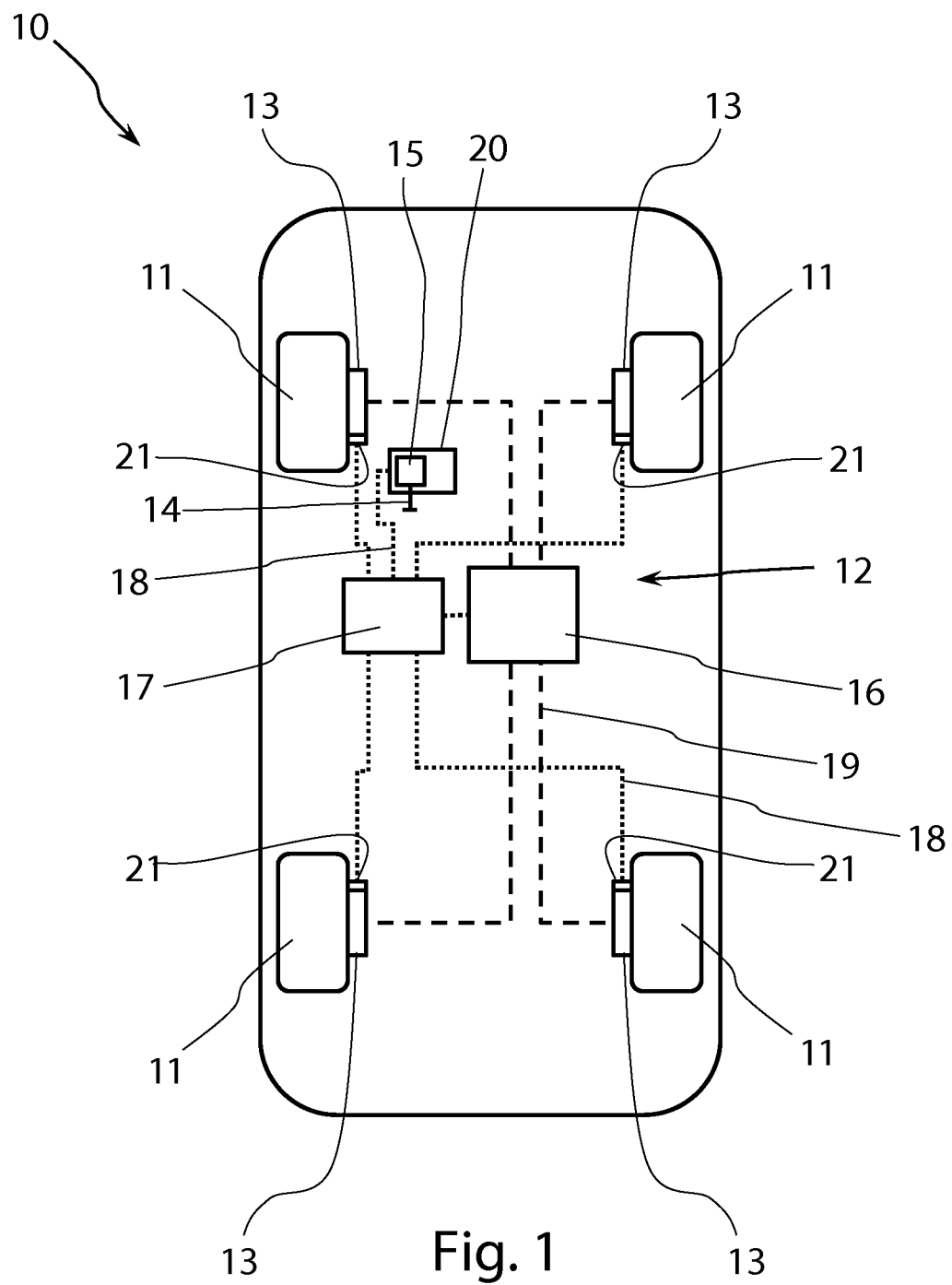
FIG. 1 is a schematic plan view of a motor vehicle utilizing a braking system according to the invention.

FIG. 1 schematically illustrates a motor vehicle 10 utilizing a braking system according to the invention. The motor vehicle 10 comprises a braking device 12 that is a so-called "Brake-By-Wire" braking device 12. The braking device 12 comprises an operating unit 20 and at least one effector unit 16. The operating unit 20 is designed to produce an electrical braking signal in the event of operation by a motor vehicle driver. The effector unit is designed to cause the braking. According to the type of the braking device 12, the operating unit 20 and the at least one effector unit 16 are connected to each other by means of an electrical line 18. The braking device 12 is designed to pass a braking signal generated by the operating unit 20 to the at least one effector unit 16.

The operating unit 20 comprises an actuating element 14 that can adopt different positions. The operating unit 20 has a current status $S_i$ that depends on the current position of the actuating element 14. In order to determine the current status $S_i$, the operating unit 20 includes a status sensor (not shown.) The actuating element 14 is preferably a brake pedal 14 that can be displaced along a pedal travel path. The respective current position of the brake pedal 14 along the pedal travel path defines the respective actual status $S_i$ of the operating unit 20.

The operating unit 20 is in particular provided with a simulator 15 that is designed to exert forces on the brake pedal 14. The forces are directed in opposition to the actuating direction, so that an operating resistance is simulated. The simulator 15 is designed to simulate counter forces in the way in which they occur on operating units of mechanical or hydraulic brake systems. In particular, the simulator 15 is designed to simulate a fixed pressure point at a defined point of the pedal travel.

The at least one effector unit 16 is the actuator of the braking device 12. The effector unit 16 can for example be an electric motor. In FIG. 1 the effector unit 16 is by way of example a motorized hydraulic master brake cylinder. It is also conceivable that the braking device 12 per wheel 11 or per axle comprises an effector unit 16. The at least one effector unit 16 is designed to cause a change of a rotation resistance on at least one of the wheels 11. For this purpose the effector unit 16 is mechanically/hydraulically connected to at least one wheel brake unit 13. In FIG. 1, the braking device 12 includes by way of example a wheel brake unit 13 per wheel 11. The effector unit 16 is connected to the four wheel brake units 13 by means of hydraulic lines 19. In the present example, the wheel brake unit 13 is a friction brake, such as a disk or drum brake. It is also possible that the wheel brake unit 13 is an electrical generator brake.

In the example shown in FIG. 1, a control unit 17 is connected between the operating unit 20 and the effector unit 16. The control unit 17 is connected to the operating unit 20 and to the effector unit 16 via electrical lines 18. The control unit 17 is designed to control or regulate the effector unit 16. The braking device 12 is configured such that the control unit 17 receives signals of the status sensor. In addition, the braking device 12 comprises at least one deceleration sensor that determines an actual deceleration $V_i$ of the motor vehicle 10. The braking device 12 is configured such that the control unit 17 receives signals of the deceleration sensor. A wheel revolution rate sensor 21 can be used as a deceleration sensor, for example. As shown in FIG. 1 the wheel revolution rate sensors 21 are connected to the control unit via electrical lines 18.

Figure 2:
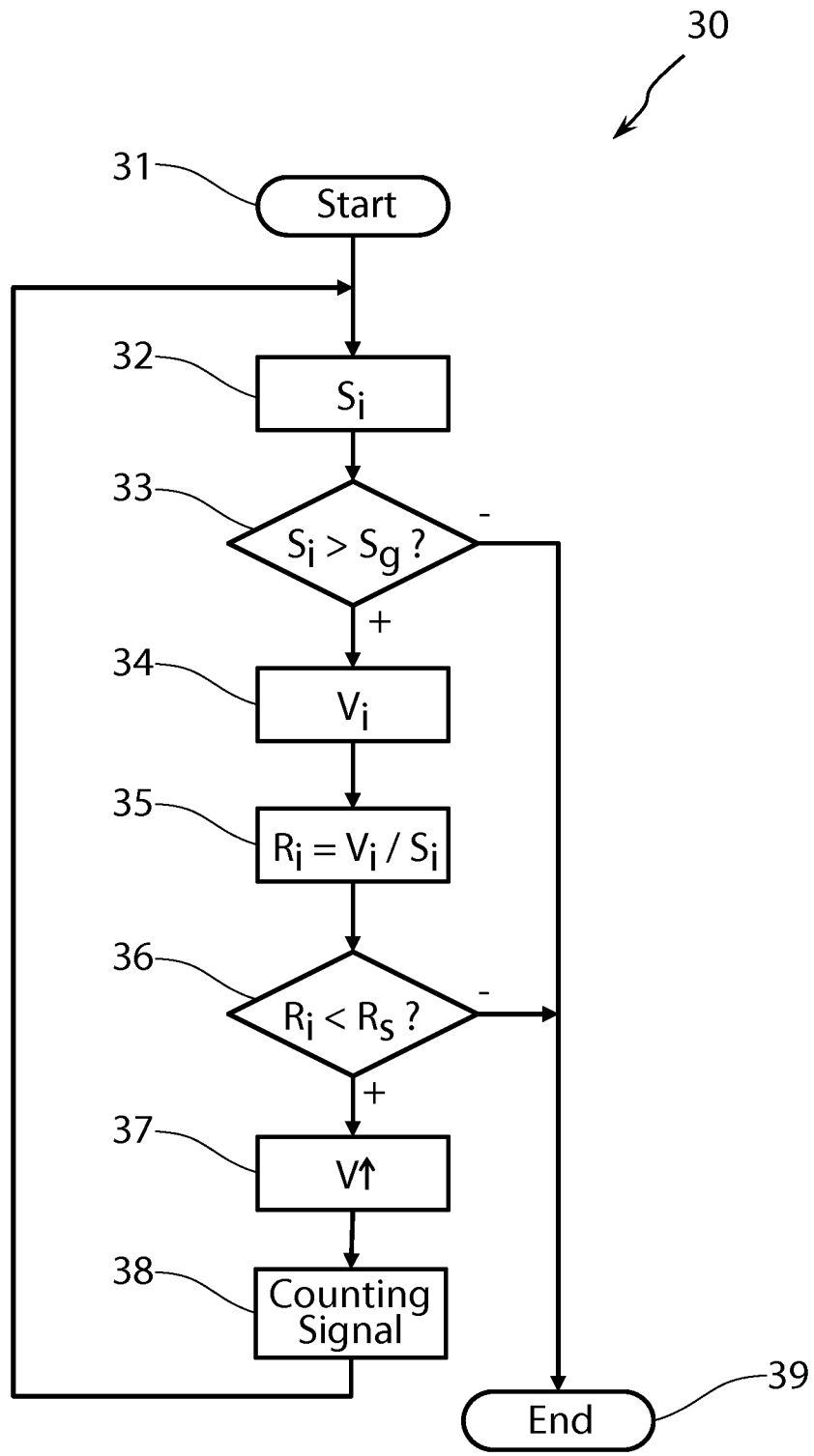
FIG. 2 is a flowchart of a method of braking a motor vehicle according to the invention.

The motor vehicle according to the invention 10 is suitable for carrying out the braking method 30 shown in FIG. 2.

Initially, in accordance with the braking method 30, decelerating a motor vehicle with a braking device having an operating unit connected to an effecting unit for effecting the deceleration, is carried out depending on an actual status of the operating unit determined in a status determination step. In the present example, the actual status is defined by an actual position of an actuating element of the operating unit.

The actual deceleration of the motor vehicle when braking is thus advantageously taken into account and is set in relation to the current status of the operating unit. Circumstances that reduce the braking effect of the braking device can thus be compensated. The confidence of the driver in the braking device and the motor vehicle is strengthened.

FIG. 2 illustrates an exemplary embodiment of the braking method 30 version in a flow chart or diagram from a start 31 to an end 39. Initially, the current actual status $S_i$ of the operating unit 20 is determined in a status determination step 32. The determined actual status $S_i$ is then investigated in a status comparison step 33 regarding its relationship with a predefined limit status $S_g$. In the embodiment shown, it is determined whether the actual status $S_i$ is greater than the limit status $S_g$. It is also conceivable to determine undershooting of a limit status $S_g$ or to check whether the actual status $S_i$ lies in a predetermined range.

With the status comparison 33, conditions can be determined in which the braking method 30 should work and conditions can be determined in which the braking method 30 should not work. The limit status $S_g$ can in particular be a value with which it is specified whether the brake pedal 14 is already at a point of the pedal travel at which the pressure point of the simulator 15 is produced, i.e. a point at which the driver of the motor vehicle 10 is expecting a significant deceleration. If the status check gives a negative result, the end 39 of the braking method 30 occurs.

Comparison of the relationship of the actual status to a limit status is determined in a status adjustment step and the deceleration is only carried out depending on the actual status. For example, if the actual status has a defined relationship to the limit status. The braking method 30 can thus be advantageously defined. In particular, the braking method 30 only carries out the braking adjustment if the brake pedal has reached a pressure point.

For example, if the status check or comparison 33 gives a positive result, the braking method 30 can be continued. The current actual deceleration $V_i$ can then be determined in a determination of deceleration step 34. In principle, the determination of deceleration step 34 can be carried out prior to the status determination step 32 or at the same time. As illustrated, an actual deceleration of the motor vehicle is determined in a deceleration determination step.

The actual deceleration $V_i$ of the motor vehicle 10 can be determined in different ways. For example, the actual deceleration $V_i$ can be determined from a change of a revolution rate of a wheel 11 or a speed of the wheel 11. During this, in particular one of the wheels 11 of a non-driven axle of the motor vehicle 10 is investigated. It is also possible to measure the instantaneous actual deceleration $V_i$ of the motor vehicle 10 by means of an acceleration sensor. In addition, it is possible to determine the actual deceleration $V_i$ by computation from a change of speed of the motor vehicle 10. The information about the instantaneous speed of the motor vehicle 10 can also be obtained during this from other vehicle systems.

In the present example, actual deceleration is determined using the wheel revolution rate change information of a wheel. In particular, the wheel revolution rate change information is determined at a wheel of a non-driven axle of the motor vehicle. The actual deceleration of the motor vehicle can thus be determined in a simple way. Wheel revolution rate sensors are to be found in many types of vehicle. Instead of determining the actual deceleration using wheel revolution rate change information, the actual deceleration can be determined using motor vehicle speed change information. In addition, actual deceleration of the motor vehicle can also be determined or obtained from other motor vehicle systems.

After the actual status $S_i$ and the actual deceleration $V_i$ are determined, an actual ratio $R_i$ of the actual deceleration $V_i$ and the actual status $S_i$ is determined in a ratio formation step 35. The actual ratio $R_i$ is then compared with a target ratio $R_s$ in a ratio comparison step 36. In the embodiment version of the braking method 10 shown, a check is made in the ratio comparison step 36 as to whether the actual ratio $R_i$ is smaller the predefined target ratio $R_s$. The target ratio $R_s$ specifies the deceleration V that the motor vehicle 10 shall have for a defined status S, i.e. for a defined pedal position. Here different target ratios $R_s$ can be predefined for different motor vehicle situations, for example for different speed ranges.

In the event of a negative result of the ratio comparison 36, the end 39 of the braking method 30 occurs. In the event of a positive result, a braking adjustment 37 is carried out. The braking adjustment 37 includes in particular measures for adjusting the actual braking power of the braking device 12.

Thus, in particular a brake pressure can be changed, wherein as shown in the present example, the deceleration V is increased. As disclosed, an actual deceleration of the motor vehicle is determined in a deceleration determination step. This is then set into an actual ratio with the actual status in a ratio formation step. In a following ratio comparison, the actual ratio is compared with a specified target ratio. If the actual ratio deviates from the target ratio, method undertakes and provides a braking adjustment step 37. In this way, a relationship between the status of the operating unit and the actual deceleration can be established and influenced rapidly and simply.

Furthermore, the braking method 30 can be used to predict a decreasing effect of the braking device 12. For this purpose a counting signal can always be generated in a counting signal generation step 38 if a braking adjustment 37, in particular an increase of the deceleration V, is carried out. It is also conceivable to count all incidences of braking of the motor vehicle 10 and thus to draw a conclusion regarding the state of the brake system 12.

Accordingly, a counting signal for counting the number of braking adjustments carried out is generated in a counting signal generation step. Additional indications and predictions regarding the state of the braking device can thus advantageously be produced. In particular, by a comparison with empirical values, a conclusion can be drawn regarding the wear of the braking device for a certain frequency of braking adjustments. This enables maintenance recommendations to be given to the driver.

Figure 3:
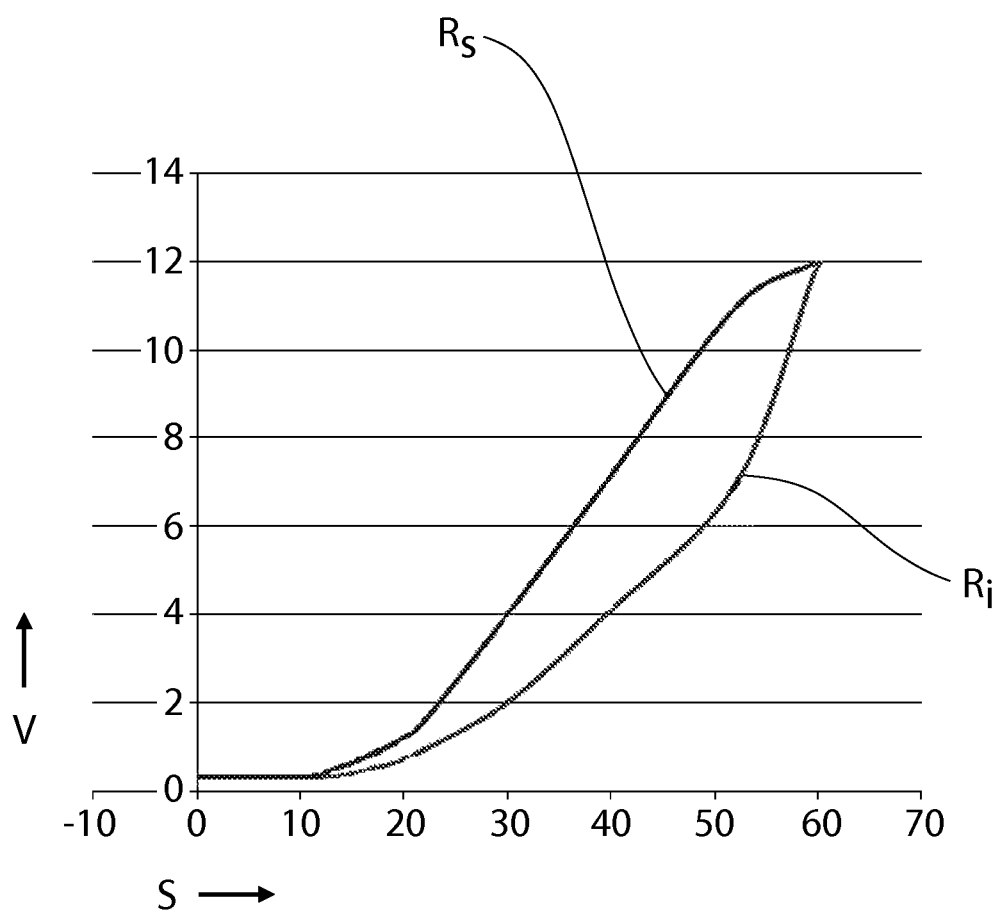
FIG. 3 is a deceleration versus status graph.

FIG. 3 illustrates, by way of example, the target ratio $R_s$ and the actual ratio $R_i$ in the form of graphs. As illustrated, the deceleration V is plotted against the status S. At the points of the status S at which the target ratio $R_s$ has a lower value than the actual ratio $R_i$, the braking power is boosted in the braking adjustment step 37.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle braking method comprising:
   determining an actual status of a brake operating unit based on position of an actuator;
   determining vehicle deceleration;
   determining an actual ratio based on the actual status and vehicle deceleration; and
   comparing said actual ratio with a target ratio and boosting a braking power when said when the target ratio is less than the actual ratio.

2. The method of claim 1 wherein vehicle deceleration is determined using wheel revolution rate change.

3. The method of claim 2 where in wheel revolution rate change is determined on a wheel of a non-driven axle of a motor vehicle.

4. The method of claim 1 wherein vehicle deceleration is determined using motor vehicle speed change information.

5. The method of claim 1 wherein the step of determining an actual status includes determining the current position of the actuator along a path of actuator travel.

6. The method of claim 1 including the step of establishing a limit status based on the position of the actuator wherein a relationship of the actual status to a limit status is determined in a status comparison step and the brake adjustment is only carried out if the actual status has a defined relationship with the limit status.

7. The method of claim 1 wherein a counting signal for counting the number of braking adjustments carried out is generated in a counting signal generation step.

8. A motor vehicle braking method comprising:
   determining a brake pedal position;
   measuring vehicle deceleration during vehicle braking;
   determining an actual ratio between measured deceleration and pedal position;
   providing a target ratio based on vehicle deceleration for a defined pedal position; and
   comparing the actual ratio with the target ratio and increasing a brake pressure when said actual ratio is less than said target ratio.

9. The method of claim 8 wherein vehicle deceleration is determined using wheel revolution rate change.

10. The method of claim 9 where in wheel revolution rate change is determined on a wheel of a non-driven axle of a motor vehicle.

11. The method of claim 8 wherein vehicle deceleration is determined using motor vehicle speed change information.

12. The method of claim 8 wherein said braking adjustment occurs when said actual ratio is less than said target ratio.

13. The method of claim 8 including the step of establishing a pedal position limit wherein a relationship of the pedal position during vehicle braking to a pedal position limit is determined in a comparison step and the braking adjustment is only carried out when the pedal position during vehicle braking has a defined relationship with the pedal position limit.

14. The method of claim 8 wherein a counting signal for counting the number of braking adjustments carried out is generated in a counting signal generation step.

15. A braking method for deceleration of a motor vehicle with a braking device comprising:
   providing an operating unit that generates an electrical braking signal when operated and a braking device actuator connected to the operating unit and the braking device;
   wherein the deceleration of the motor vehicle is carried out depending on an actual status of the operating unit determined in a status determination step, wherein the actual status is defined by a current position of an actuating element of the operating unit; and
   wherein actual deceleration of the motor vehicle is determined in a determination of deceleration step, the deceleration is set in an actual ratio with the actual status in a ratio formation step, the actual ratio is compared with a specified target ratio in a ratio comparison step and the braking device actuator is adjusted in a braking adjustment step if the actual ratio deviates from the target ratio.

16. The braking method as claimed in claim 15, wherein the actual deceleration is determined using the wheel revolution rate change information of a wheel.

17. The braking method as claimed in claim 16, wherein the wheel revolution rate change information is determined on a wheel of a non-driven axle of the motor vehicle.

18. The braking method as claimed in claim 15, wherein the actual deceleration is determined using motor vehicle speed change information.

19. The braking method as claimed in claim 15 wherein a relationship of the actual status to a limit status is determined in a status comparison step and the deceleration is only carried out depending on the actual status if the actual status has a defined relationship with the limit status.

20. The braking method as claimed in claim 15 wherein braking adjustment step includes boosting a braking power of a wheel brake unit.

* * * * *